United States Patent [19]

Gillis

[11] Patent Number: 4,760,647

[45] Date of Patent: Aug. 2, 1988

[54] LINEAR MEASURING APPARATUS

[76] Inventor: David P. Gillis, #3 Washington Pl., Norwich, Conn. 06360

[21] Appl. No.: 119,672

[22] Filed: Nov. 12, 1987

[51] Int. Cl.$^4$ .............................................. G01B 7/02
[52] U.S. Cl. .................................................. 33/141 E
[58] Field of Search .............. 33/141 R, 141 E, 141.5, 33/142, 133, 134 R, 129; 377/17, 18, 24

[56] References Cited

U.S. PATENT DOCUMENTS

| | | | |
|---|---|---|---|
| 1,718,052 | 6/1929 | Lineaweaver | 33/141 R |
| 2,557,450 | 6/1951 | Mentzel . | |
| 3,293,760 | 12/1966 | Weller . | |
| 3,436,954 | 4/1969 | Eppler . | |
| 3,497,957 | 3/1970 | Jorgensen . | |
| 3,656,239 | 4/1972 | Hutchinsen et al. . | |
| 3,700,164 | 10/1972 | Slagle . | |
| 3,790,761 | 2/1974 | Crabtree | 377/24 |
| 4,700,484 | 10/1987 | Frank | 33/141 E |

FOREIGN PATENT DOCUMENTS 0036901  2/1985  Japan .................. 33/141 E

*Primary Examiner*—Harry N. Haroian
*Attorney, Agent, or Firm*—Albert W. Hilburger

[57] ABSTRACT

A hand-held linear measuring device is enclosed within an elongated housing which has a handle at one end and an opening at the opposite end. A wheel mounted on the housing and protruding through the opening rotates as it engages and is drawn across a surface to be measured. As the wheel is rotated, it rotates a selector disk about a parallel axis. A plurality of radially extending elongated slots are formed in the selector disk at equally spaced azimuthal locations. A contact member extends transversely through each slot and is selectively, releasably, fastened thereto at one of a plurality of predetermined radial positions. As the selector disk rotates, it causes the contact members to successively engage an electrically conductive resilient whisker member extending across the path of their advance. Electrical pulses are thereby generated and are received by a counter which sums them up, then displays a value equivalent to the distance traveled by the wheel and in the particular unit of measurement selected by the user to be displayed by the counter.

18 Claims, 3 Drawing Sheets

LINEAR MEASURING APPARATUS

BAGKGROUND OF THE INVENTION

I. Field of the Invention

This invention relates generally to linear measuring devices and, more particularly, to such devices which have a digital readout and which can be selectively adjusted so as to measure distance along a surface and provide a readout of a predetermined unit of measurement.

II. Description of the Prior Art

There is a large variety of known devices engageable with continuously advancing material for measuring the length thereof. Typical of such known devices are the disclosures in the following U.S. Pat. Nos. 2,557,450 to Mentzel for measuring lengths of steel bars prior to cutting them to length; U.S. Pat. No. 3,293,760 to Weller for determining the amount of yarn used during the manufacture of knitted fabric; U.S. Pat. No. 3,436,954 to Eppler for measuring the length of cable to assure that the proper length is wound onto a reel; and U.S. Pat. No. 3,497,957 to Jorgensen for determining the length of a glass sheet in preparation for cutting it.

Other known devices engageable with a rotating object are disclosed in U.S. Pat. No. 3,656,239 to Hutchinson et al who disclose apparatus for measuring the diameter or a workpiece being operated on a machine such as a lathe or a boring machine; and to Slagle, U.S. Pat. No. 3,700,164 who discloses an odometer selectively engageable with the wheel of a ground traversing vehicle for measuring the distance traveled.

These known devices, and many others like them, are of a relatively complex design with the result that they have a resulting high intial cost and, subsequently require substantial maintenance which is an additional high cost item. It will further be noted that they are generally an intergral part of machinery for performing specific high speed operations. This is in contrast with the need for a hand held unit readily available to the user for measuring distances along objects and surfaces which are irregular in shape, such that the distances are not easily measureable with a conventional tape or rule.

It was with knowledge of the current state-of-the-art as represented by the devices just described that the present invention was conceived and has now been reduced to practice.

SUMMARY OF THE INVENTION

The present invention is directed toward a hand-held linear measuring device which is enclosed within an elongated housing having a handle at one end and an aperture at the opposite end.

The invention is of a simplified construction such that it can be inexpensively manufactured and maintained. Additionally, the present invention utilizes materials and components which are readily available. Thus, initial cost is minimal as well as the expense of its maintenance.

As noted above, a primary feature of the invention resides in its ability to be readily converted from measuring and providing a readout of one unit of measurement to another. That is, the device of the invention enables the user to rapidly change from measuring inches to measuring centimeters, for example, while assuring the accuracy of the measurement so made.

Other and further features, objects, advantages, and benefits of the invention will become apparent from the following description taken in conjunction with the accompanying drawings. It is to be understood that the foregoing general description and the following detailed description are exemplary and explanatory but are not to be restrictive of the invention. The accompanying drawings which are incorporated in and constitute a part of this invention, illustrate one of the embodiments of the invention and, together with the description, serve to explain the principles of the invention in general terms. Like numerals refer to like parts throughout the disclosure.

DETAILED DESCRIPTION OF THE PREFERRED EMBODIMENT

Figure 1:
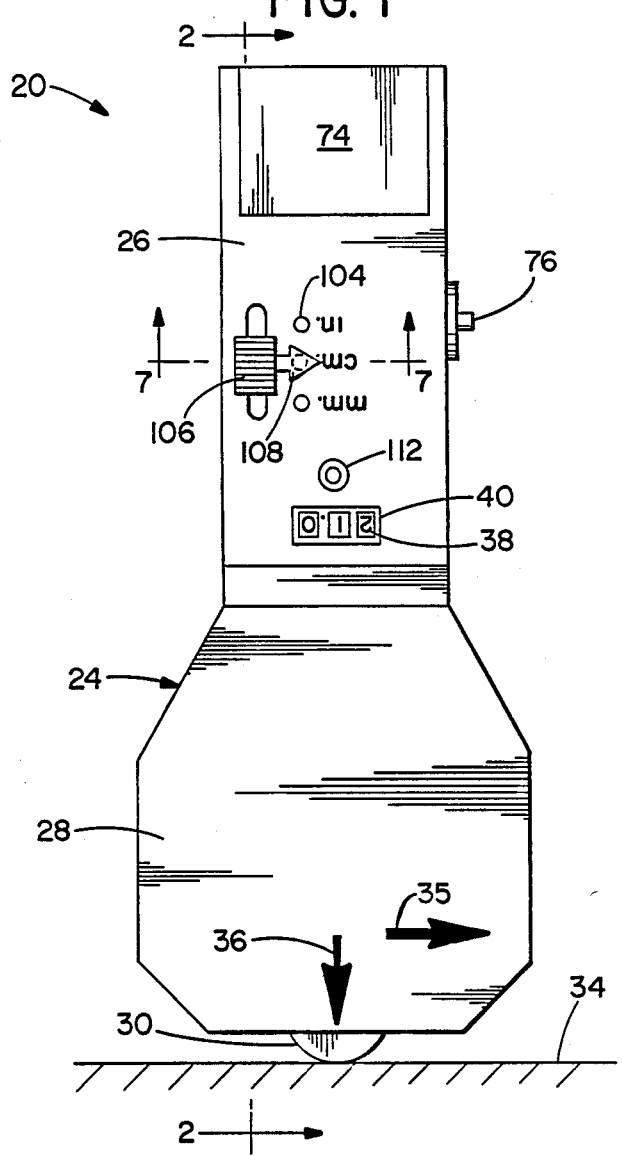
FIG. 1 is a side elevation view of a linear measuring unit embodying the invention.
Figure 2:
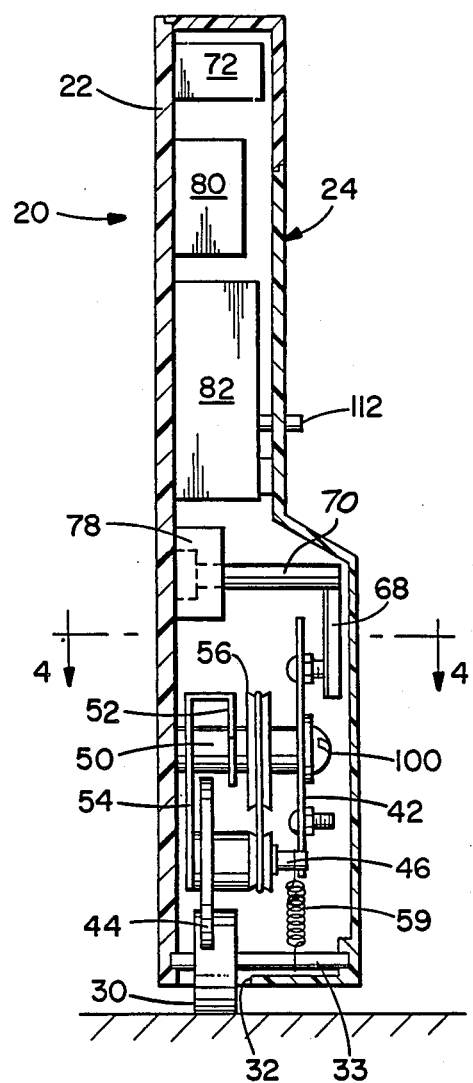
FIG. 2 is a cross section view of the linear measuring unit taken generally along line 2—2 in FIG. 1.

Turn now to the drawings and, initially, to FIGS. 1 and 2 which illustrate a hand-held linear measuring unit 20 comprising an elongated housing which includes a base 22 and a mating cover 24. The housing defines a handle portion 26 at one end and a working portion 28 at its opposite end. A wheel 30 is rotatably mounted on the base 22 and projects through an opening 32 (FIGS. 2 and 3) formed in the base. The wheel 30 is mounted on an axle 33 which extends generally transversely of the base 22 and cover 24.

When operating the unit 20, a user grips the handle portion 26 and places the wheel 30 against a surface 34 along which a distance is to be measured. He positions a suitable marker 36 formed or mounted on the cover 24 so that it is aligned with the beginning of the distance to be measured. With the wheel 30 rotatingly engaged with the surface 34, the user draws the unit 20 along the surface 34 in the direction of an arow 35 (FIG. 1) so as to measure the distance of interest and, as this occurs, a digital display 38 of the distance traversed is indicated through an aperture 40 formed in the cover 24. The display 38 may be of the mechanical variety or may be of the LED or LCD variety, or of some other suitable type.

Figure 4:
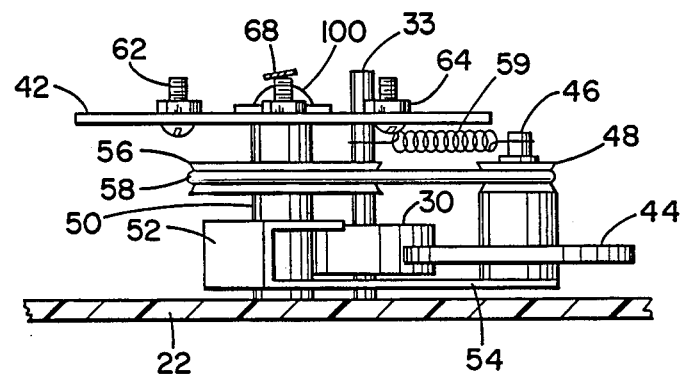
FIG. 4 is a cross section view taken generally along line 4—4 in FIG. 2.

The internal mechanism which achieves this end result will now be described with particular reference to FIGS. 2, 3, and 4. Rotation of the wheel 30 ultimately results in rotation at a significantly higher rate of a selector disk 42 mounted on an axis generally parallel with that of the wheel 30. For this purpose, a pinch roller 44 is rotatably received on a upstanding shaft 46 fixed to a U-shaped bracket 52. Integral with the pinch roller 44 is a first pulley 48. In a similar manner, the selector disk 42 is rotatably mounted on a shaft 50 which is suitably mounted to the base 22. The U-shaped bracket 52 is pivotally mounted to the shaft 50 at one end and has a lower leg 54 to the end of which is fixed the upstanding shaft 46. The longitudinal axis of the shaft 50 is parallel to that of the shaft 46 and, in a manner similar to the pinch roller 44 with its associated pulley 48, the selector disk 42 has an associated second pulley 56 mounted on the shaft 50 for unitary rotation therewith.

A continuous belt 58 drivingly connects the pulleys 48 and 56. The wheel 30 is peripherally engaged with the pinch roller 44 whereby rotation thereof is transmitted via pulley 48, belt 58 and pulley 56 to the selector disk 42. A tension spring 59 connected at its opposite ends, respectively, to axle 33 and shaft 46 positively biases the pinch roller 44 into peripheral engagement with the wheel 30. It will be understood, however, that other suitable expedients for biasing the pinch roller into engagement with the wheel may be satisfactorily employed. It will be appreciated that by reason of the relative diameters of the wheel 30, pinch roller 34 and pulleys 48 and 56, rotation of the selector disk 42 will be at a substantially greater rate than that of the wheel 30.

Figure 3:
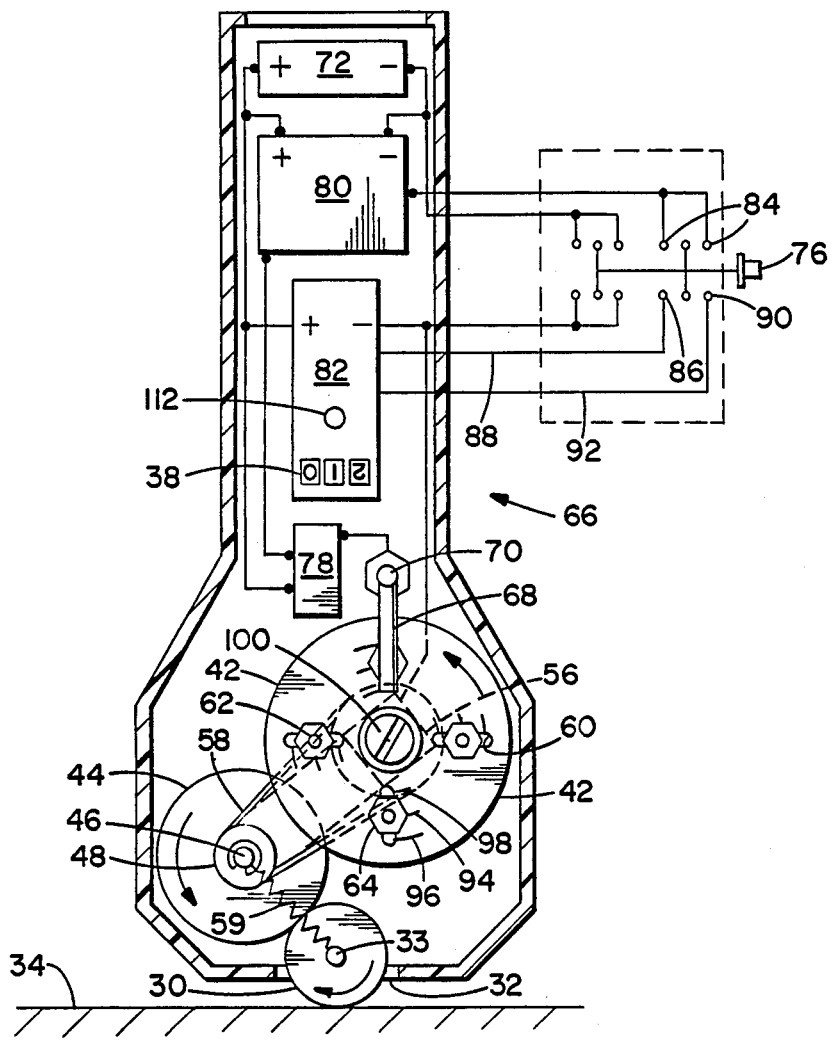
FIG. 3 is a diagrammatic top plan view of the unit illustrated in FIGS. 1 and 2 with the cover removed.
Figure 6:
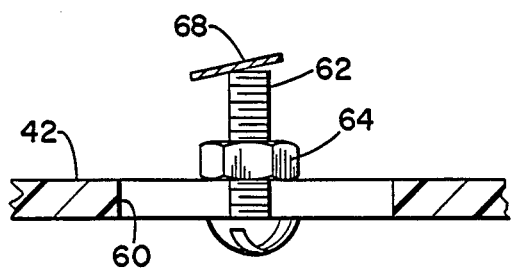
FIG. 6 is a cross section view taken generally along line 6—6 in FIG. 5.
Figure 5:
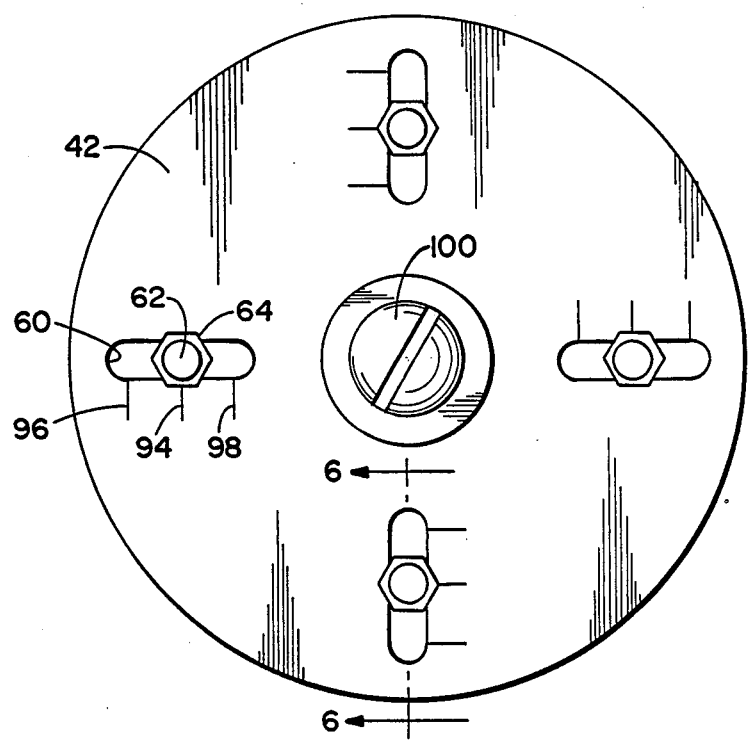
FIG. 5 is a detail top plan view illustrating in enlarged fashion a component illustrated in FIG. 3.

As seen in FIG. 3 and even more clearly in FIGS. 5 and 6, the selector disk 42 is formed with a plurality of radially extending elongated slots 60 at equally spaced azimuthal locations. A contact member 62 which may be, for example, a screw, extends transversely through each slot 60 and is releaseably fixed to the selector disk 42 by means of a nut 64 or other suitable fastener. All of the contact members 62 mounted on the disk 42 are simultaneously positioned at identical radial positions as will be discussed subsequently.

As will be seen, with particular reference to FIG. 3, electrical circuitry 66 is provided in association with the mechanism already described to translate rotation of the wheel 30 to the information communicated by the digital display 38. All of the components about to be described are readily available and are well known to a technician skilled in the art.

To this end, a substantially fixed electric pick-up member 68 in the form of a highly resilient electrically conductive whisker is fixed at one end to a mounting post 70 fixed to and upstanding from the base 22. The pick-up member extends in cantilever fashion across the path of the advancing contact members 62 as the selector disk 42 rotates. As the selector disk 42 rotates, the contact members 62 merely graze the pick-up member 68, that is, engage it only sufficiently to assure that an electrical connection has been completed. The pick-up member 68 should be of a sufficient elevation that only the extreme tip end of a contact member 62 engages the underside of the pick-up member 68 as seen in FIG. 6.

With continuing reference to FIG. 3, the electrical circuitry 66 is energized in any suitable manner as, for example, by means of a nine volt battery 72 which may be removably mounted on the base 22 through an access cap 74 in the cover 24. The circuitry 66 may be turned on and off by means of a switch 76 mounted on the cover 24.

Thus, with the switch 76 turned on, as the wheel 30 rotates, and causes a contact member 62 to engage the pick-up member 68, the previously open circuit is closed thereby energizing a relay 78 which transmits a pulse to a suitable pulse generator 80. The pulse generator, in turn, transmits the pulse to a suitable counter 82 whose output is visible at the digital display 38. The pulse generator 80 serves to smooth out the pulses first generated by the relay 78, providing a well shaped wave form to the counter 82. This is for the reason that most commercially available counters would not be consistently responsive to a signal of the nature emitted by the relay 78.

The switch 76 is not only operable to energize the circuit 66, but also selects the mode of operation of the counter. For example, when the switch is operated to connect a contact 84 with a contact 86, the pulse generator 80 is thereby connected with a count down lead 88 to the counter 82 so that the counter counts backwards or downward. By the same token, if the switch 76 is operated to connect the contact 84 with a contact 90, the pulse generator 80 is thereby connected to a count up lead 92 such that the counter is caused to count forwardly or upwardly as in the customary fashion.

The positioning of the contact members 62 relative to their associated elongated slots 60 is important for calibrating the measuring unit 20 for determining a particular unit of measurement which the unit will indicate by means of the digital display 38. The unit 20 is designed such that when the wheel 30 has traveled, for example, 21 centimeters, the display will indicate 21.0 (see FIGS. 1 and 3) with the contact members 62 positioned adjacent an appropriate mark 94 or other suitable indicia means formed on the selector disk 42. If the contact member 62 is moved to a position adjacent a similar mark 96 at a greater radial distance from the center of rotation of the selector disk, then the resultant reading on the display 38 could be a measurement of inches and if the contact members 62 are positioned a mark 98, at a lesser radial distance from the center of rotation of the selector disk 42, then the unit of measurement might be in millimeters.

Of course, it will be appreciated that unit 20 can be designed for many different units of measurement and that the digital display 38 may indicate more digits than illustrated in FIGS. 1 or 3.

It is also within the purview of the invention to replace the slots 60 with a plurality of individual holes formed along a radius. In this instance, contact members 62 would extend through those individual holes, each being positioned for a particular unit of measurement.

As seen in FIG. 3, it is contemplated that the selector disk be removable from the shaft 50. In this event, the upper end of the shaft would be drilled and tapped to receive a mating screw 100. In this instance, it would be possible to replace one selector disk with another. With this possibility, it can be envisioned that a selector disk would be formed without slots 60 and that, instead, there would be a family of selector disks each with the contact members 62 formed integrally thereon at different radial distances from the center for different disks.

Figure 7:
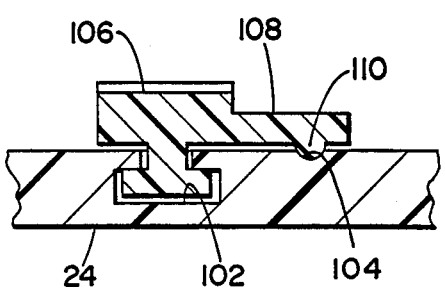
FIG. 7 is a detail cross section view taken generally along line 7—7 in FIG. 1.

It may be desirable to provide an indication which can be readily visible to the user as to which unit of measurement the measuring unit 20 is currently set for. For this purpose, then, as seen in FIG. 7, the cover 24 may be formed with a keyway 102 therein having a longitudinal axis generally parallel with that of the cover itself. Adjacent the keyway and formed in the outer surface of the cover 24 are a plurality of spaced detents 104 located along a line generally parallel to the longitudinal axis of the keyway. Each detent serves to indicate a particular unit of measurement as visually provided by the digital display 38 of the counter 82. A manually moveable indicator 106 is slideably received for movement along the keyway 102 and includes a suitable pointer 108 with a knob 110 on its lower surface selectively engageable with each of the detents 104. Thus, when the knob 110 is engaged with an appropriate detent 104, the pointer 108 indicates a particular unit of measurement which may be printed on the cover 104 or otherwise formed thereon as illustrated in FIG. 1.

In the operation of the measuring unit 20, a user grips the handle portion 26 and presses a reset button 112 to the counter 82 in the event it is first desired to return the digital display 38 to zero. Then, the user actuates the switch 76, moving it so as to cause contacts 84 and 90 to connect. This assures that operation of the device will cause the digital display to count up rather than count down. In the alternative, of course, it may be desirable to retain the display at some predetermined value, then operate the switch 76 to connect contacts 84 and 86 so that the counter 82 will count down and when the digital display 38 reaches zero, the desired distance will have been reached. Prior to its operation, the user will have made certain that the contact members 62 are in their proper positions in the slots 60 so that the proper unit of measurement will be displayed. The user will also move the indicator 106 so that pointer 108 is indicative of the proper unit of measurement to be measured. Then, the user causes the wheel 30 to engage the surface 34 to be measured and places the marker 36 adjacent the desired point of beginning. Then, as the unit is drawn across the surface 34, the digital display 38 will indicate the distance traversed in the proper units of measurement.

While a preferred embodiment of the invention has been disclosed in detail, it should be understood by those skilled in the art that various other modifications may be made to the illustrated embodiment without departing from the scope of the invention as described in the specification and defined in the appended claims.

What is claimed is:

1. Hand-held linear measuring apparatus comprising:
   a wheel mounted for rotation as it is drawn in engagement with, and across, a surface to be measured;
   pulsing means responsive to rotation of said wheel for generating a series of pulses numerically proportional to the distance traveled by said wheel along said surface; and
   counter means for summing up the pulses from said pulsing means and for visually displaying a value equivalent to the distance traveled by said wheel along the surface;
   said pulsing means including actuating means selectively adjustable for determining the particular unit of measurement to be displayed by said counter means;
   said actuating means including:
   a rotatable selector disk drivingly engaged with said wheel;
   a plurality of electrical contact members releasably mounted to said selector disk on a common radius for a selected unit of measurement of azimuthally equally spaced locations; and
   a substantially fixed electrical pick-up member adjacent said selector disk successively engageable with said contact members upon rotation of said selector disk.

2. Hand-held linear measuring apparatus as set forth in claim 1
   wherein said pulsing means includes:
   a source of electrical energy; and
   electrical circuitry interconnecting said contact members, said source, said pulsing means, said counter means, and said pick-up member;
   said electrical circuitry being closed when one of said contact members is engaged with said pick-up member.

3. Hand-held linear measuring apparatus as set forth in claim 2
   wherein said source of electrical energy is a battery.

4. Hand-held linear measuring apparatus as set forth in claim 2
   wherein said pulsing means includes:
   a digital pulsing unit; and
   relay means intermediate said contact members on said selector disk and said pulsing unit operable for intermittently energizing said pulsing unit as one of said contact members engages said pick-up member.

5. Hand-held linear measuring apparatus as set forth in claim 1 including:
   manually movable indicator means for selectively indicating the particular unit of measurement selected to be displayed by said counter means.

6. Hand-held linear measuring apparatus as set forth in claim 1
   wherein said selector disk is rotatable on an axis parallel to the axis of rotation of said wheel and has a plurality of radially extending elongated slots therein at equally spaced azimuthal locations; and
   wherein each of said contact members extends transversely through an associated slot.

7. Hand-held linear measuring apparatus as set forth in claim 6 including:
   fastener means for selectively fixing each of said contact members at a predetermined radial position according to the particular unit of measurement selected to be displayed by said counter means.

8. Hand-held linear measuring apparatus as set forth in claim 7 including:
   indicia means on said selector disk associated with each elongated slot to designate each of a plurality of positions at spaced locations along the slot associated with a particular unit of measurement.

9. Hand-held linear measuring apparatus comprising:
   an elongated housing including a base and a cover matingly engageable with said base, said housing defining a handle portion at one end and having an opening at its opposite end;
   a wheel rotatably mounted on said base and extending at least partially through said opening such that said wheel is caused to rotate when it is drawn in engagement with, and across, a surface to be measured;
   pulsing means responsive to rotation of said wheel for generating a series of pulses numerically proportional to the distance traveled by said wheel along the surface;
   counter means for summing up the pulses from said pulsing means and for visually displaying a value equivalent to the distance traveled by said wheel along the surface;
   said pulsing means including:
   a selector disk rotatably mounted on said base and drivingly engaged with said wheel;
   a plurality of electrical contact members releasably mounted to said selector disk on a common radius for a selected unit of measurement at azimuthally equally spaced locations; and
   a substantially fixed electrical pick-up member adjacent said selector disk successively engageable with said contact members upon rotation of said selector disk.

10. Hand-held linear measuring apparatus as set forth in claim 9
wherein said pulsing means includes:
a source of electrical energy; and
electrical circuitry interconnecting said contact members, said source, said pulsing means, said counter means, and said pick-up member;
said electrical circuitry being closed when one of said contact members is engaged with said pick-up member.

11. Hand-held linear measuring apparatus as set forth in claim 10 wherein said source of electrical energy is a battery.

12. Hand-held linear measuring apparatus as set forth in claim 10
wherein said pulsing means includes:
a digital pulsing unit; and
relay means intermediate said contact members on said selector disk and said pulsing unit operable for intermittently energizing said pulsing unit as one of said contact members engages said pick-up member.

13. Hand-held linear measuring apparatus as set forth in claim 9
wherein said cover has a keyway formed therein having a longitudinal axis and a plurality of spaced detents formed therein located along a line generally parallel to the longitudinal axis of said keyway, each said detent selectively indicating a particular unit of measurement which can be displayed by said counter means; and
including:
manually movable indicator means slidingly engaged with said keyway and having a knob thereon releasably engageable with each of said detents for selectively indicating the particular unit of measurement to be displayed by said counter means.

14. Hand-held linear measuring apparatus as set forth in claim 9
wherein said selector disk is rotatable on an axis parallel to the axis of rotation of said wheel and has a plurality of radially extending elongated slots therein at equally spaced azimuthal locations; and
wherein each of said contact members extends transversely through an associated slot.

15. Hand-held linear measuring apparatus as set forth in claim 14 including:
fastener means for selectively fixing each of said contact members at a predetermined radial position according to the particular unit of measurement selected to be displayed by said counter means.

16. Hand-held linear measuring apparatus as set forth in claim 15 including:
indicia means on said selector disk associated with each elongated slot to designate each of a plurality of positions at spaced locations along the slot associated with a particular unit of measurement.

17. Hand-held linear measuring apparatus as set forth in claim 9
wherein said pick-up member is an electrically conductive resilient whisker extending across the path of advance of said contact members.

18. Hand-held linear measuring apparatus as set forth in claim 9
wherein said cover has first and second apertures therein;
wherein said counter means has a display window aligned with the first aperture; and
wherein said counter means includes a manually operable reset button aligned with and extending through and beyond the second aperture.

* * * * *